(12) United States Patent
Zhang et al.

(10) Patent No.: US 10,454,840 B2
(45) Date of Patent: Oct. 22, 2019

(54) TRANSMISSION CONTROL PROTOCOL RECEIVER CONTROLLED INTERRUPTION MITIGATION

(71) Applicant: Intel Corporation, Santa Clara, CA (US)

(72) Inventors: Menglei Zhang, Santa Clara, CA (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/868,802

(22) Filed: Jan. 11, 2018

(65) Prior Publication Data

US 2019/0044874 A1    Feb. 7, 2019

(51) Int. Cl.
| | |
|---|---|
| *H04L 12/823* | (2013.01) |
| *H04L 29/06* | (2006.01) |
| *H04L 29/08* | (2006.01) |
| *H04B 17/318* | (2015.01) |
| *H04L 12/801* | (2013.01) |
| *H04L 12/861* | (2013.01) |
| *H04L 5/00* | (2006.01) |

(52) U.S. Cl.
CPC ......... *H04L 47/323* (2013.01); *H04B 17/318* (2015.01); *H04L 47/12* (2013.01); *H04L 49/90* (2013.01); *H04L 69/16* (2013.01); *H04L 69/163* (2013.01); *H04L 69/323* (2013.01); *H04L 69/326* (2013.01); *H04L 5/0055* (2013.01); *H04L 67/12* (2013.01)

(58) Field of Classification Search
None
See application file for complete search history.

(56) References Cited

U.S. PATENT DOCUMENTS

2015/0236966 A1* 8/2015 Francini .................. H04L 47/27
370/235
2016/0249353 A1* 8/2016 Nakata .................. H04W 28/16

OTHER PUBLICATIONS

"CoDel", Wikipedia, [online] https://en.wikipedia.org/wiki/CoDel accessed on Apr. 10, 208, (Mar. 28, 2018), 4 pgs.
Zhang, Menglei, et al., "Transport Layer Performance in 5G mmWave Cellular", NYU Tandon School of Engineering, (Mar. 8, 2016), 9 pgs.

* cited by examiner

*Primary Examiner* — Anh Ngoc M Nguyen
(74) *Attorney, Agent, or Firm* — Schwegman Lundberg & Woessner, P.A.

(57) ABSTRACT

System and techniques for transmission controller protocol (TCP) receiver controller interruption mitigation are described herein. At a receiver device, a physical link degradation indication of a physical link may be obtained. In response to the physical link degradation indication, a transmission queue may be measured to determine bufferbloat that is a result of a temporary blockage of the physical link. The receiver device may then transmit, to a second device on the physical link, a TCP receive window size update that is smaller than a previous TCP receive window size.

24 Claims, 9 Drawing Sheets

TRANSMISSION CONTROL PROTOCOL RECEIVER CONTROLLED INTERRUPTION MITIGATION

TECHNICAL FIELD

Embodiments described herein generally relate to computer networking and more specifically to transmission control protocol (TCP) receiver controlled interruption mitigation.

BACKGROUND

The transmission control protocol (TCP) is a network communication standard at the transport layer of a networking stack. TCP generally provides facilities to reliably (e.g., in order, error checked, with re-transmission, etc.) transport data via internet protocol (IP) between host devices. TCP generally includes establishing connections between hosts and transferring data over established connections. Thus, TCP may involve greater set-up that stateless protocols, such as the user datagram protocol (UDP). In addition to providing facilities for error checking, in order delivery, and retransmission of data, TCP also includes a number of congestion recognition and mitigation capabilities.

TCP operates at a network layer somewhat higher than the physical (PHY) or media access (MAC) layers. In next generation wireless networks, these PHY and MAC layers are evolving to include more radio bands in a wider range of frequencies than have generally been used in the past. Millimeter wave PHY layers are becoming more common with the next generation wireless networks. Millimeter wave radio band communications for next generation wireless networks may provide significant bandwidth and latency benefits. Often, bands are structured such that downlink (e.g., from the network to a device) channels have more bandwidth than uplink channels, to address likely use cases in which the uplink is used primarily to transmit compact query data or acknowledgments (ACKs) from the device to the network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
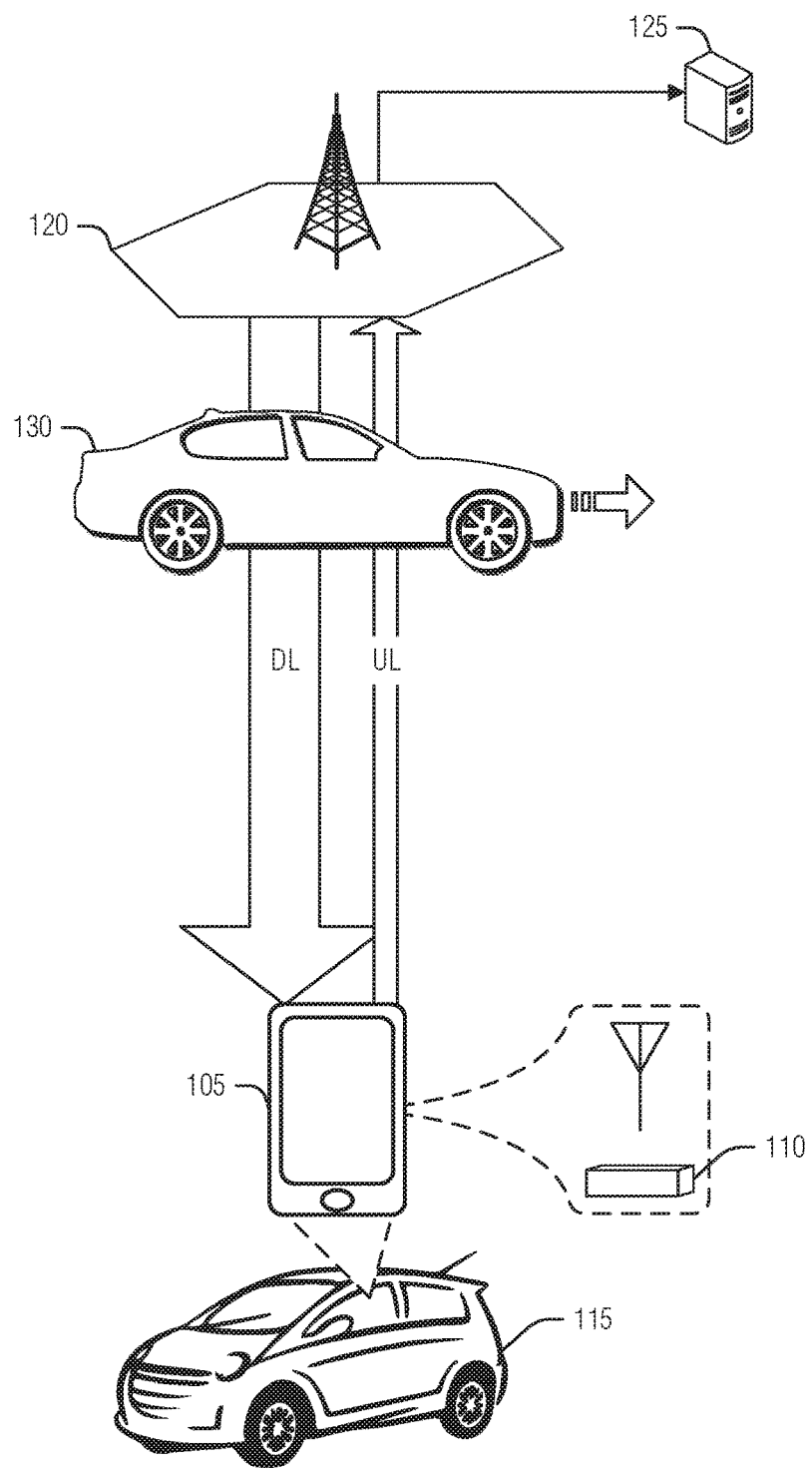
FIG. 1 is a block diagram of an example of an environment including a system for TCP receiver controller interruption mitigation, according to an embodiment.

As noted above, next generation wireless networks (e.g., cellular systems) are expected to provide very high peak data rate (e.g. ten gigabits per second (Gbps)) by using high frequency radio bands or spectrum, such as millimeter wave. An issue with high frequency bands, such as millimeter wave bands, is significant signal degradation due to path losses. These radio bands are more readily absorbed by atmospheric moisture, building materials, and vehicles, leading to environmentally sensitive radio links, which may cause rapidly changing data rates. In TCP environments, the change from high throughput to low throughput may result in "bufferbloat," whereby a network tuned for high throughput fills its buffers during periods of low-throughput. The accumulation of data in buffers may lead to unacceptable latency, or maladaptive network congestion mitigation.

To address the problems above, active queue management (AQM) is often employed. AQM generally monitors transmission queue status—such as queue length, delay, etc.—to detect potential bufferbloat before it becomes a problem. AQM then proactively drops packets to trigger the congestion control of the TCP sender, reducing packet rates and preventing the uncontrolled accumulation of packets in the receiver's buffer.

AQM, however, has a number of drawbacks. For example, the TCP sender may not reduce its transmission rate quickly enough. Here, many packets may already be queuing in the buffer. When a retransmitted packet arrives, the retransmitted packet waits in the buffer until all preceding packets are transmitted. Then, those preceding packets wait at the TCP receiver until the retransmitted packet is successfully transmitted to maintain in-order delivery of all packets. During this period, an application will receive no data at all, experiencing "zero" throughput. Another AQM drawback occurs when the TCP sender reduces its transmission rate too much. This situation underutilizes the link, effectively wasting the PHY resources leading to low throughput.

To address the bufferbloat issue and AQM deficiencies noted above, a device may monitor is physical layer for interruptions (e.g., blockages) and signal its TCP partner to reduce the data rate via the TCP receiver window adjustment. Because the device is in a position to determine the radio quality, it may also quickly ascertain by what amount the data rate should be reduced to prevent bufferbloat while also effectively using the underlying radio resource. The TCP receiver window permits this level of control. In contrast, the more traditionally employed TCP congestion window operates by a sender, and not a receiver. Because the sender does not have the radio link information, the TCP congestion window technique fails as noted above. Either the TCP congestion window or the TCP receiver window may be used to reduce the data rate, the small of these two values ultimately determining the data rate. Thus, the more dynamic radio link layer sensing coupled with receiver congestion signaling via the TCP receiver window, enables an effective solution to bufferbloat without wasting radio link resources. Additional details and examples are provided below.

FIG. 1 is a block diagram of an example of an environment including a system for TCP receiver controller interruption mitigation, according to an embodiment. The environment includes a TCP endpoint 125 (e.g., a content provider, server, etc.), network infrastructure 120 (e.g., an access point (AP), enhanced NodeB (eNb), 5G gNB, etc.), and a device 105 (e.g., user equipment (UE), station (STA), tablet, etc.). The device 105 may be part of, or contained within, a vehicle 115. As the device 105 moves, the radio link to the network infrastructure 120 may be interrupted (e.g., blocked) by a number of obstructions 130, such as another vehicle, building, etc.

The device 105 includes a network controller 110 (e.g., a modem, processor, etc.) coupled to an antenna and TCP entities, such as applications, operating systems, etc. These entities communicate with the TCP endpoint 125 via the network controller 110 and the network infrastructure 120. To address radio link blockage at the device 105, rather than at the TCP endpoint 125, the network controller 110 is arranged to obtain a physical link degradation indication of the physical link. In an example, the physical link is a millimeter wave radio link. In an example, the physical link degradation indication is at least one of channel quality indication (CQI), received signal strength indicator (RSSI), reference signal received power (RSRP), or reference signal received quality (RSRQ). These metrics are often available in cellular networks (e.g., those networks that operate in accordance with a third generation partnership project (3GPP) family of standards, the IEEE 802.11, 80.216, or 802.15 families of standards, or other wireless technologies. In an example, blockage of the physical link is indicated in response to a twenty decibel drop of signal strength within a one hundred millisecond window.

Once the network controller 110 has an indication of an adverse radio condition, the network controller 110 is arranged to measure the transmission queue to determine that the physical link degradation indication corresponds to a temporary blockage of the physical link. This measurement avoids using the TCP receiver window manipulation of the TCP stream (e.g., flow) when there is a more permanent radio link degradation, as may be experienced when the device 105 moves farther away from the network infrastructure 120. In an example, the measurement includes the network controller 110 to measure the minimum delay experienced by packets in the running buffer window. Bufferbloat is predicted when the minimum delay rises too high (e.g., it surpasses a threshold for the minimum delay).

The network controller 110 is arranged to transmit, e.g., to the TCP endpoint 125, a TCP receive window size update in response to the temporary blockage. In an example, the TCP receiver window size update is a TCP receive window size that is smaller than a previous TCP receive window size. Thus, the TCP endpoint 125 will reduce its data rate, resulting in less buffer accumulation on the device 105. In an example, the TCP receive window size update applies to all TCP streams for the device. In an example, the TCP receive window size update is specific to each TCP stream for the device.

In an example, the TCP receive window size update is based on a degree of the temporary blockage. Thus, if the radio link is partially blocked, the TCP receive window size update may be proportional to the degradation in receive capability. This technique tends to maximize the radio link utilization. In an example, the degree of the temporary blockage is based on the transmission queue. Thus, if the transmission queue is larger (e.g., a greater backlog), then the TCP receive window size update will be smaller to allow the backlog to clear. In an example, the network controller 110 is arranged to decrease a subsequent TCP receive window size update in accordance with a change in the transmission queue. This subsequent TCP receive window size update is transmitted to the TCP endpoint 125. This last example illustrates the dynamic, and device 105 controlled nature, of congestion management by the receiver. Thus, a more responsive, and radio resource efficient, technique for temporary signal interruption is achieved over that of AQM or TCP endpoint 125 managed congestion mitigation.

Figure 2:
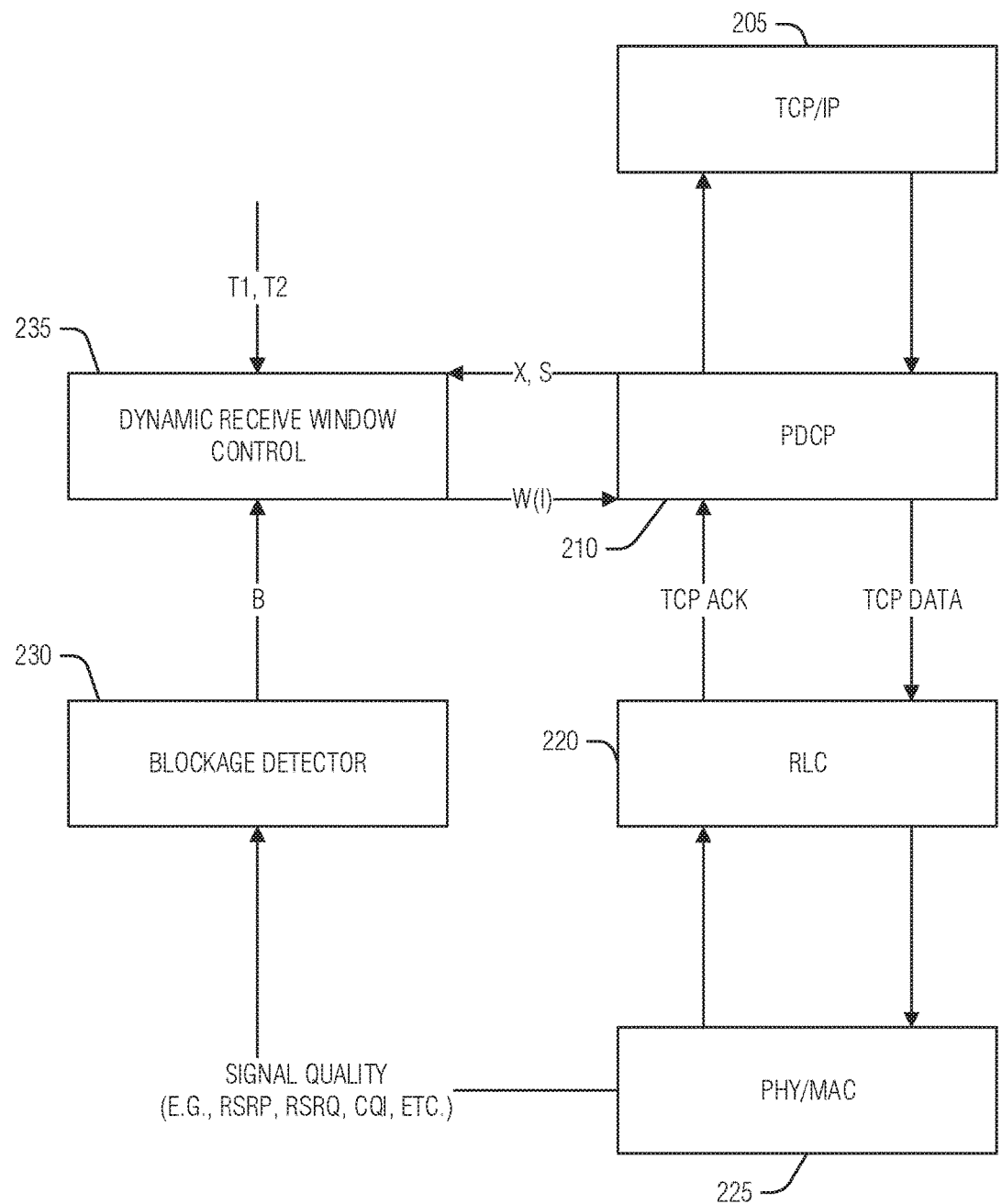
FIG. 2 is a block diagram of component communications for TCP receiver controller interruption mitigation, according to an embodiment.

FIG. 2 is a block diagram of component communications for TCP receiver controlled interruption mitigation, according to an embodiment. The PDCP 210 circuitry may implement transmission queue management for data sent and received by a TCP/IP 205 layer (e.g., operating systems, applications, etc.) before going to a radio link control 220 and ultimately a PHY or MAC layer 225. In an example, PDCP 210 may monitor the transmission queue using the CoDel active queue management algorithm. The PDCP 210 drops TCP data packets according to CoDel when there is no temporary blockage of the radio link. When there is a radio link blockage, the PDCP 210 updates the TCP receiver window field in a TCP ACK packet on the reverse path according to the TCP receiver window $w(i)$.

The Dynamic receive window controller (DRWC) 235 accepts: the configuration parameters T1 and T2; and real-time measurement state variables x, s, and b as inputs. The DRWC 235 then produces the per-flow TCP receiver window $w(i)$.

The blockage detector 230 receives radio link measurement indicia from the PHY or MAC layer 225 to monitor the radio link signal quality. The indicia may include RSRP, RSRQ, CQI, among others. The blockage detector 230 then applies a threshold (e.g., a rate threshold) to these indicia to detect temporary blockages. For example, the blockage detector 230 may indicate a temporary blockage in response to significant signal quality changes (e.g., plus or minus twenty decibels (dB)) within a short time window (e.g., one hundred milliseconds (ms)). A variety of signal blockage techniques may be employed.

In operation, CoDel distinguishes between two types of queues: a good queue and a bad queue. The good queue is defined as a queue that exhibits no bufferbloat. In a good queue, communication bursts cause no more than a temporary increase in queue delay. During these conditions, radio link utilization is generally good (e.g., maximized). A bad queue is defined as a queue that exhibits bufferbloat. Here, communication bursts cause the buffer to fill up and stay filled (e.g., fail to empty in a timely manner). The bad queue condition often results in low radio link utilization and high buffer delay.

Within the CoDel context, the state variables described above are:
  x: the average throughput in the last bad queue interval;
  s: queue type indicator for the transmission queue storing TCP data packets—e.g., s=0 for a good queue and s=1 for a bad queue;
  b: the blockage indicator—e.g., b=1 indicates that the link is experiencing temporary blockage;
  c: the estimated TCP receive window with the per-UE control option during the blockage; and w(i): the TCP receive window for flow i, where i is the UE TCP port number of the flow.

The following configuration parameters may also be used:

T1 the maximum round trip time and

T2: the maximum blockage duration.

With these variables in mind, in response to receiving a TCP ACK of flow i from the lower layer (e.g., RLC 220), the PDCP 210 provides x, and s to the DRWC 235. If the blockage detector 230 is signaling a blockage (e.g., b=1) and the timer T2 is not expired, then the DRWC 235 has detected a temporary blockage. In response, if this is the first TCP ACK after the blockage is detected, the DRWC 235 sets c to zero, sets w(i) to zero for all i (TCP flows), stops dropping TCP data packets, and starts timer T2. The DRWC 235 then performs the following tests and corresponding actions:

If the queue is bad (e.g., s=1) and it is the first bad queue interval after the blockage, then the DRWC 235 sets c=T1* x. Else, the DRWC 235 sets $$c = \frac{c}{2}$$

for each bad queue interval.

If the queue is good (e.g., s=0) and c>0, then the DRWC 235 sets $$c = c + \frac{1}{c}$$

for each received TCP ACK of any flow i.

If c>0, then the DRWC 235 outputs w(i)=c to the PDCP 210. Here, all flows share the same TCP receive window c during the blockage.

If the timer T2 is not expired, then the DRWC 235 cancels T2 and starts dropping TCP data packets. The DRWC 235 then performs the following tests and corresponding actions:

If the blockage detector 230 indicates a blockage (e.g., b=1) and c>0, then the DRWC 235 sets $$c = c + \frac{1}{c}$$

for each received TCP ACK of any flow i, and the DRWC 235 sets w(i)=c.

If the blockage detector 230 does not indicate a blockage (e.g., b=0) and w(i)>0, the DRWC 235 sets w(i)=+1 for each received TCP ACK of the flow i.

The above technique sets a single TCP receive window for all TCP flows. Per-flow control may also be implemented in much the same manner as the technique above by modifying the following situations:

1) When b=1, the timer T2 has not expired, s=1, and it is not the first bad queue interval after the blockage, then:

If w(i)=0, the DRWC 235 sets w(i)=max(wj)∀j∈flows; Otherwise the DRWC 235 sets $$w(i) = \frac{w(i)}{2}$$

for each bad queue interval.

2) When b=1, the timer T2 has expired, and w(i)>0, then the DRWC 235 sets $$w(i) = w(i) + \frac{1}{w(i)}.$$

Figure 3:
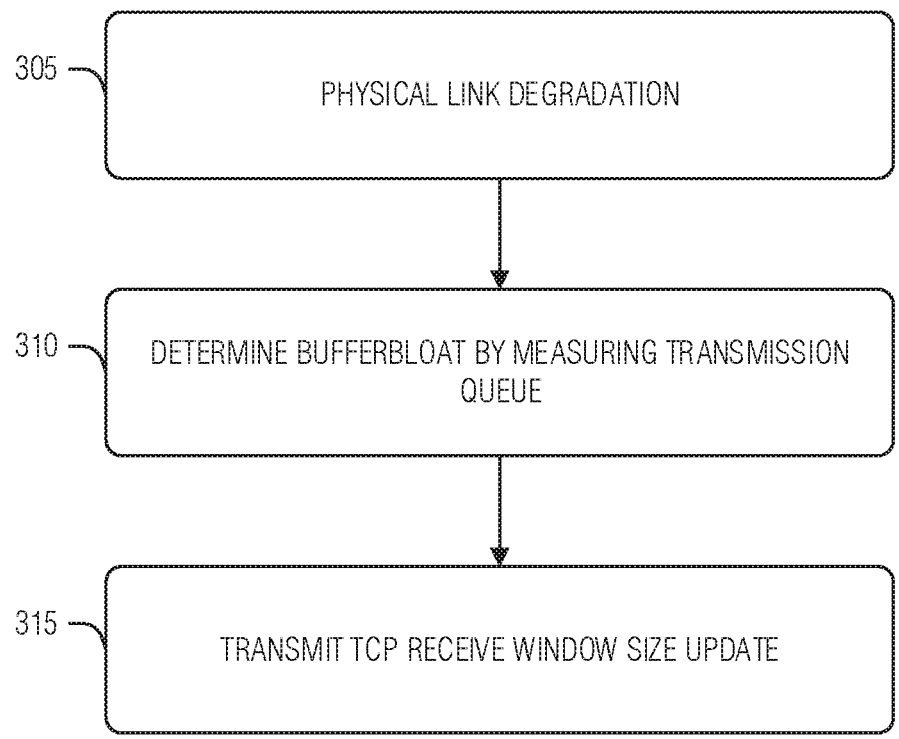
FIG. 3 illustrates a flow diagram of an example of a method for TCP receiver controller interruption mitigation, according to an embodiment.

FIG. 3 illustrates a flow diagram of an example of a method 300 for TCP receiver controlled interruption mitigation, according to an embodiment. The operations of the method 300 are implemented in electronic hardware, such as that described above or below (e.g., processing circuitry). In an example, this hardware is in a device (e.g., user equipment (UE), station (STA), etc.), that is different than a network infrastructure unit, such as an access point (AP), enhanced NodeB (eNb), or the like.

At operation 305, a physical link degradation indication of a physical link is obtained (e.g., received or retrieved). In an example, the physical link is a millimeter wave radio link. In an example, the physical link degradation indication is at least one of channel quality indication (CQI), received signal strength indicator (RSSI), reference signal received power (RSRP), or reference signal received quality (RSRQ). In an example, blockage of the physical link is indicated in response to a twenty decibel drop of signal strength with a one hundred millisecond window.

At operation 310, a transmission queue is measured to determine whether there is bufferbloat. In an example, measuring the transmission queue includes measuring the minimum delay experienced by packets in the running buffer window, as in the CoDel active queue management algorithm.

At operation 315, a TCP receive window size update that is smaller than a previous TCP receive window size is transmitted to a second device on the physical link in response to the temporary blockage. In an example, the TCP receive window size applies to all TCP streams for the device. In an example, the TCP receive window size is specific to each TCP stream for the device.

In an example, the TCP receive window size update is based on a degree of the temporary blockage. In an example, the degree of the temporary blockage is based on the transmission queue. In an example, the method 300 may include the additional operations of decreasing a subsequent TCP receive window size update in accordance with a change in the transmission queue, and transmitting, to the second device on the physical link, the subsequent TCP receive window size update.

In an example, measuring the transmission queue and transmitting the TCP receive window size update are performed at a packet data convergence protocol (PDCP) layer of a communications (e.g. cellular) stack.

In an example, the device operates in accordance with a 3GPP family of standards. In an example, the device operates in accordance with an IEEE 802.11 family of standards.

Figure 4:
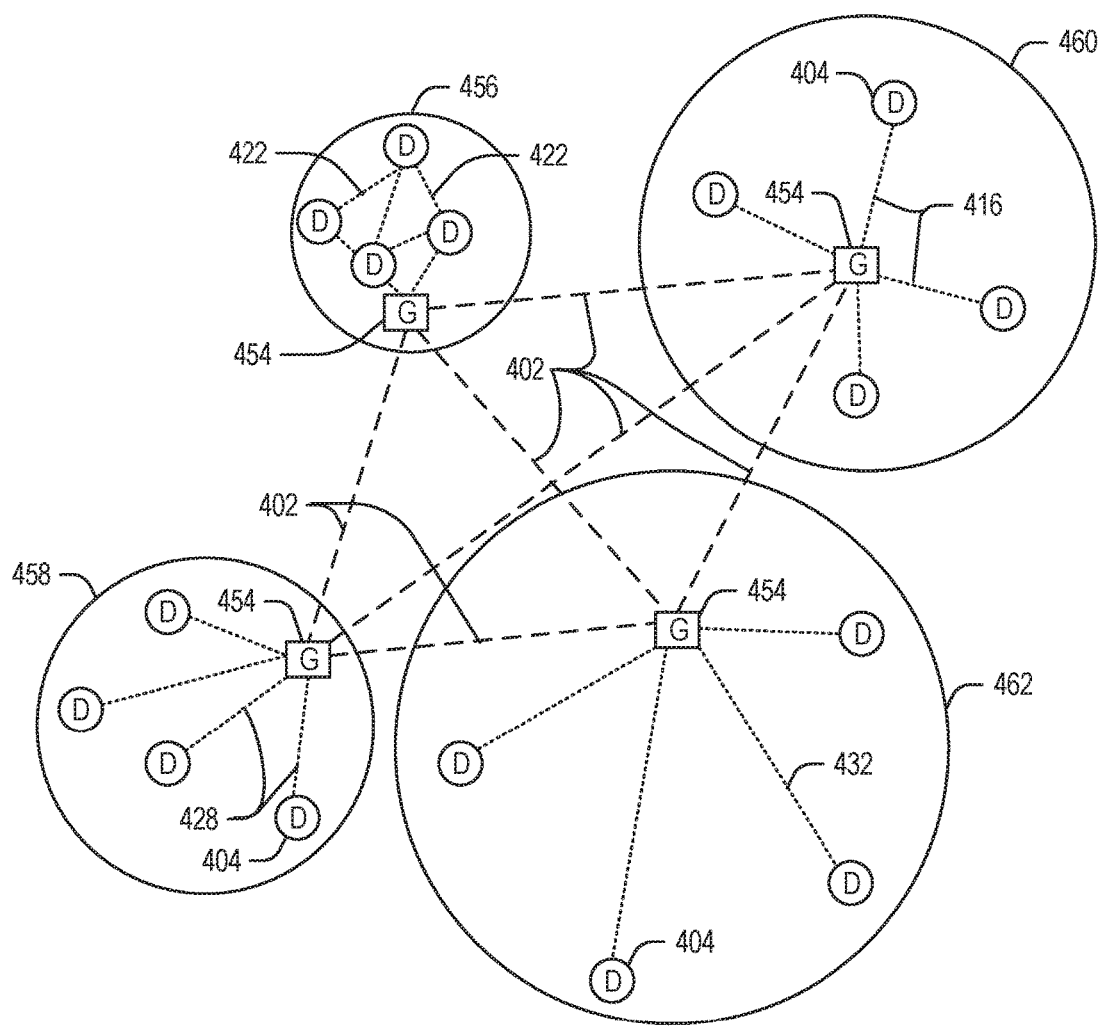
FIG. 4 illustrates an example domain topology for respective Internet of Things networks coupled through links to respective gateways, according to an embodiment.

FIG. 4 illustrates an example domain topology for respective Internet of Things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 5:
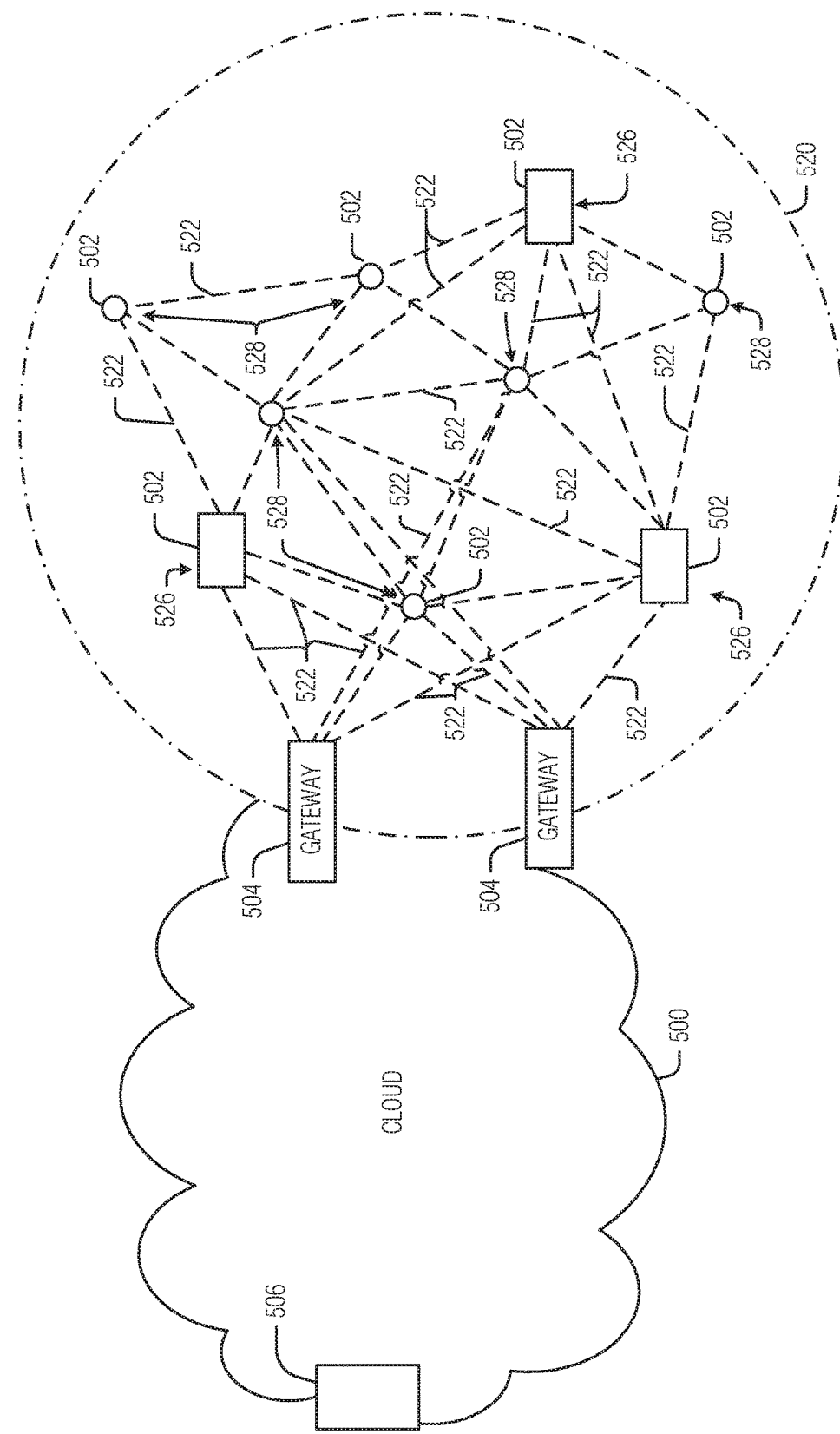
FIG. 5 illustrates a cloud computing network in communication with a mesh network of Internet of Things devices operating as a fog device at the edge of the cloud computing network, according to an embodiment.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 4 and 5, present a number of new challenges in a heterogeneous network of connectivity comprising a combination of wired and wireless technologies.

FIG. 4 specifically provides a simplified drawing of a domain topology that may be used for a number of Internet of Things (IoT) networks comprising devices 404, with the IoT networks 456, 458, 460, 462, coupled through backbone links 402 to respective gateways 454. For example, a number of IoT devices 404 may communicate with a gateway 454, and with each other through the gateway 454. To simplify the drawing, not every IoT device 404, or communications link (e.g., link 416, 422, 428, or 432) is labeled. The backbone links 402 may include any number of wired or wireless technologies, including optical networks, and may be part of a local area network (LAN), a wide area network (WAN), or the Internet. Additionally, such communication links facilitate optical signal paths among both IoT devices 404 and gateways 454, including the use of MUXing/deMUXing components that facilitate interconnection of the various devices.

The network topology may include any number of types of IoT networks, such as a mesh network provided with the network 456 using Bluetooth low energy (BLE) links 422. Other types of IoT networks that may be present include a wireless local area network (WLAN) network 458 used to communicate with IoT devices 404 through IEEE 802.11 (Wi-Fi®) links 428, a cellular network 460 used to communicate with IoT devices 404 through an LTE/LTE-A (4G) or 5G cellular network, and a low-power wide area (LPWA) network 462, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 404, such as over the backbone links 402, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and traceability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 456, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 458, for instance, may use systems that perform standards conversion to provide multi-standard connectivity, enabling IoT devices 404 using different protocols to communicate. Further systems may provide seamless interconnectivity across a multi-standard infrastructure comprising visible Internet resources and hidden Internet resources.

Communications in the cellular network 460, for instance, may be enhanced by systems that offload data, extend communications to more remote devices, or both. The LPWA network 462 may include systems that perform non-Internet protocol (IP) to IP interconnections, addressing, and routing. Further, each of the IoT devices 404 may include the appropriate transceiver for wide area communications with that device. Further, each IoT device 404 may include other transceivers for communications using additional protocols and frequencies. This is discussed further with respect to the communication environment and hardware of an IoT processing device depicted in FIGS. 6 and 7.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 5 below.

FIG. 5 illustrates a cloud computing network in communication with a mesh network of IoT devices (devices 502) operating as a fog device at the edge of the cloud computing network. The mesh network of IoT devices may be termed a fog 520, operating at the edge of the cloud 500. To simplify the diagram, not every IoT device 502 is labeled.

The fog 520 may be considered to be a massively interconnected network wherein a number of IoT devices 502 are in communications with each other, for example, by radio links 522. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 502 are shown in this example, gateways 504, data aggregators 526, and sensors 528, although any combinations of IoT devices 502 and functionality may be used. The gateways 504 may be edge devices that provide communications between the cloud 500 and the fog 520, and may also provide the backend process function for data obtained from sensors 528, such as motion data, flow data, temperature data, and the like. The data aggregators 526 may collect data from any number of the sensors 528, and perform the back end processing function for the analysis. The results, raw data, or both may be passed along to the cloud 500 through the gateways 504. The sensors 528 may be full IoT devices 502, for example, capable of both collecting data and processing the data. In some cases, the sensors 528 may be more limited in functionality, for example, collecting the data and allowing the data aggregators 526 or gateways 504 to process the data.

Communications from any IoT device 502 may be passed along a convenient path (e.g., a most convenient path) between any of the IoT devices 502 to reach the gateways 504. In these networks, the number of interconnections provide substantial redundancy, allowing communications to be maintained, even with the loss of a number of IoT devices 502. Further, the use of a mesh network may allow IoT devices 502 that are very low power or located at a distance from infrastructure to be used, as the range to connect to another IoT device 502 may be much less than the range to connect to the gateways 504.

The fog 520 provided from these IoT devices 502 may be presented to devices in the cloud 500, such as a server 506, as a single device located at the edge of the cloud 500, e.g., a fog device. In this example, the alerts coming from the fog device may be sent without being identified as coming from a specific IoT device 502 within the fog 520. In this fashion, the fog 520 may be considered a distributed platform that provides computing and storage resources to perform processing or data-intensive tasks such as data analytics, data aggregation, and machine-learning, among others.

In some examples, the IoT devices 502 may be configured using an imperative programming style, e.g., with each IoT device 502 having a specific function and communication partners. However, the IoT devices 502 forming the fog device may be configured in a declarative programming style, allowing the IoT devices 502 to reconfigure their operations and communications, such as to determine needed resources in response to conditions, queries, and device failures. As an example, a query from a user located at a server 506 about the operations of a subset of equipment monitored by the IoT devices 502 may result in the fog 520 device selecting the IoT devices 502, such as particular sensors 528, needed to answer the query. The data front these sensors 528 may then be aggregated and analyzed by any combination of the sensors 528, data aggregators 526, or gateways 504, before being sent on by the fog 520 device to the server 506 to answer the query. In this example, IoT devices 502 in the fog 520 may select the sensors 528 used based on the query, such as adding data from flow sensors or temperature sensors. Further, if some of the IoT devices 502 are not operational, other IoT devices 502 in the fog 520 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 6:
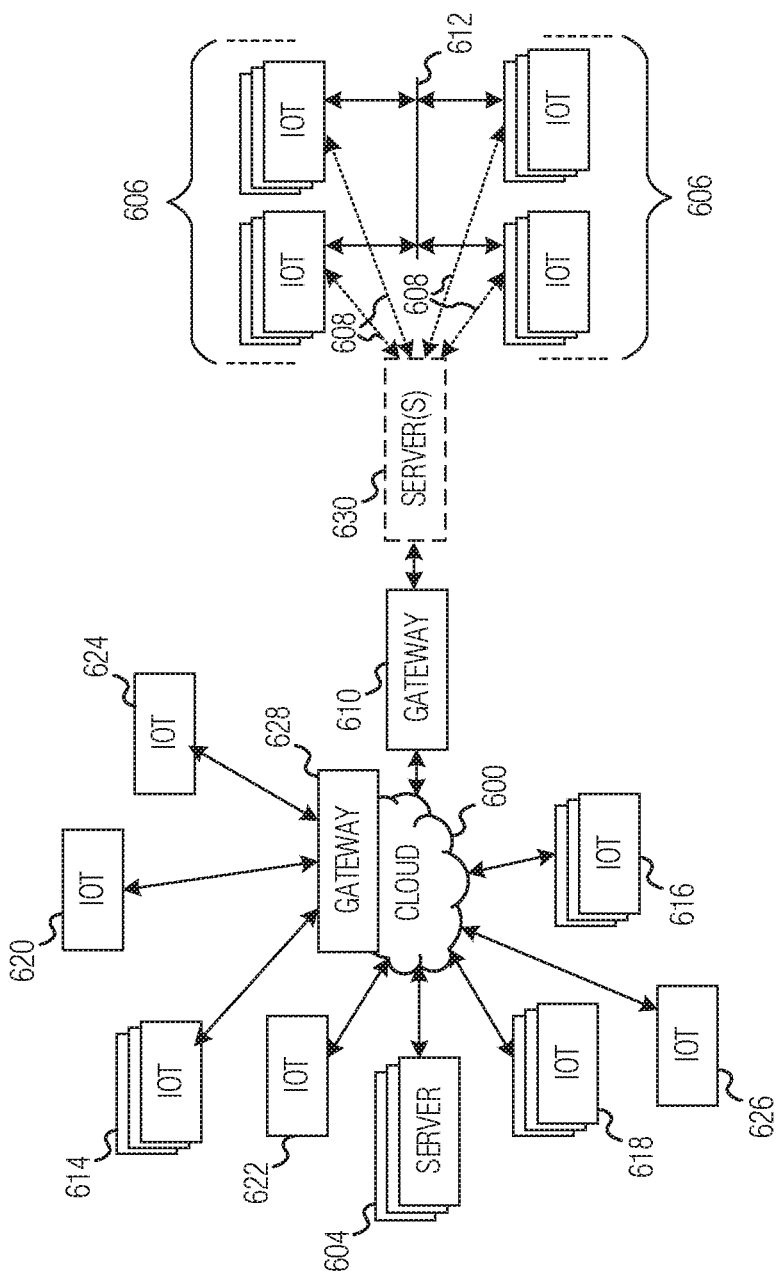
FIG. 6 illustrates a drawing of a cloud computing network, or cloud, in communication with a number of Internet of Things devices, according to an embodiment.

FIG. 6 illustrates a drawing of a cloud computing network, or cloud 600, in communication with a number of Internet of Things (IoT) devices. The cloud 600 may represent the Internet, or may be a local area network (LAN), or a wide area network (WAN), such as a proprietary network for a company. The IoT devices may include any number of different types of devices, grouped in various combinations. For example, a traffic control group 606 may include IoT devices along streets in a city. These IoT devices may include stoplights, traffic flow monitors, cameras, weather sensors, and the like. The traffic control group 606, or other subgroups, may be in communication with the cloud 600 through wired or wireless links 608, such as LPWA links, optical links, and the like. Further, a wired or wireless sub-network 612 may allow the IoT devices to communicate with each other, such as through a local area network, a wireless local area network, and the like. The IoT devices may use another device, such as a gateway 610 or 628 to communicate with remote locations such as the cloud 600; the IoT devices may also use one or more servers 630 to facilitate communication with the cloud 600 or with the gateway 610. For example, the one or more servers 630 may operate as an intermediate network node to support a local edge cloud or fog implementation among a local area network. Further, the gateway 628 that is depicted may operate in a cloud-to-gateway-to-many edge devices configuration, such as with the various IoT devices 614, 620, 624 being constrained or dynamic to an assignment and use of resources in the cloud 600.

Other example groups of IoT devices may include remote weather stations 614, local information terminals 616, alarm systems 618, automated teller machines 620, alarm panels 622, or moving vehicles, such as emergency vehicles 624 or other vehicles 626, among many others. Each of these IoT devices may be in communication with other IoT devices, with servers 604, with another IoT fog device or system (not shown, but depicted in FIG. 5), or a combination therein. The groups of IoT devices may be deployed in various residential, commercial, and industrial settings (including in both private or public environments).

As may be seen from FIG. 6, a large number of IoT devices may be communicating through the cloud 600. This may allow different IoT devices to request or provide information to other devices autonomously. For example, a group of IoT devices (e.g., the traffic control group 606) may request a current weather forecast from a group of remote weather stations 614, which may provide the forecast without human intervention. Further, an emergency vehicle 624 may be alerted by an automated teller machine 620 that a burglary is in progress. As the emergency vehicle 624 proceeds towards the automated teller machine 620, it may access the traffic control group 606 to request clearance to the location, for example, by lights turning red to block cross traffic at an intersection in sufficient time for the emergency vehicle 624 to have unimpeded access to the intersection.

Clusters of IoT devices, such as the remote weather stations 614 or the traffic control group 606, may be equipped to communicate with other IoT devices as well as with the cloud 600. This may allow the IoT devices to form an ad-hoc network between the devices, allowing them to function as a single device, which may be termed a fog device or system (e.g., as described above with reference to FIG. 5).

Figure 7:
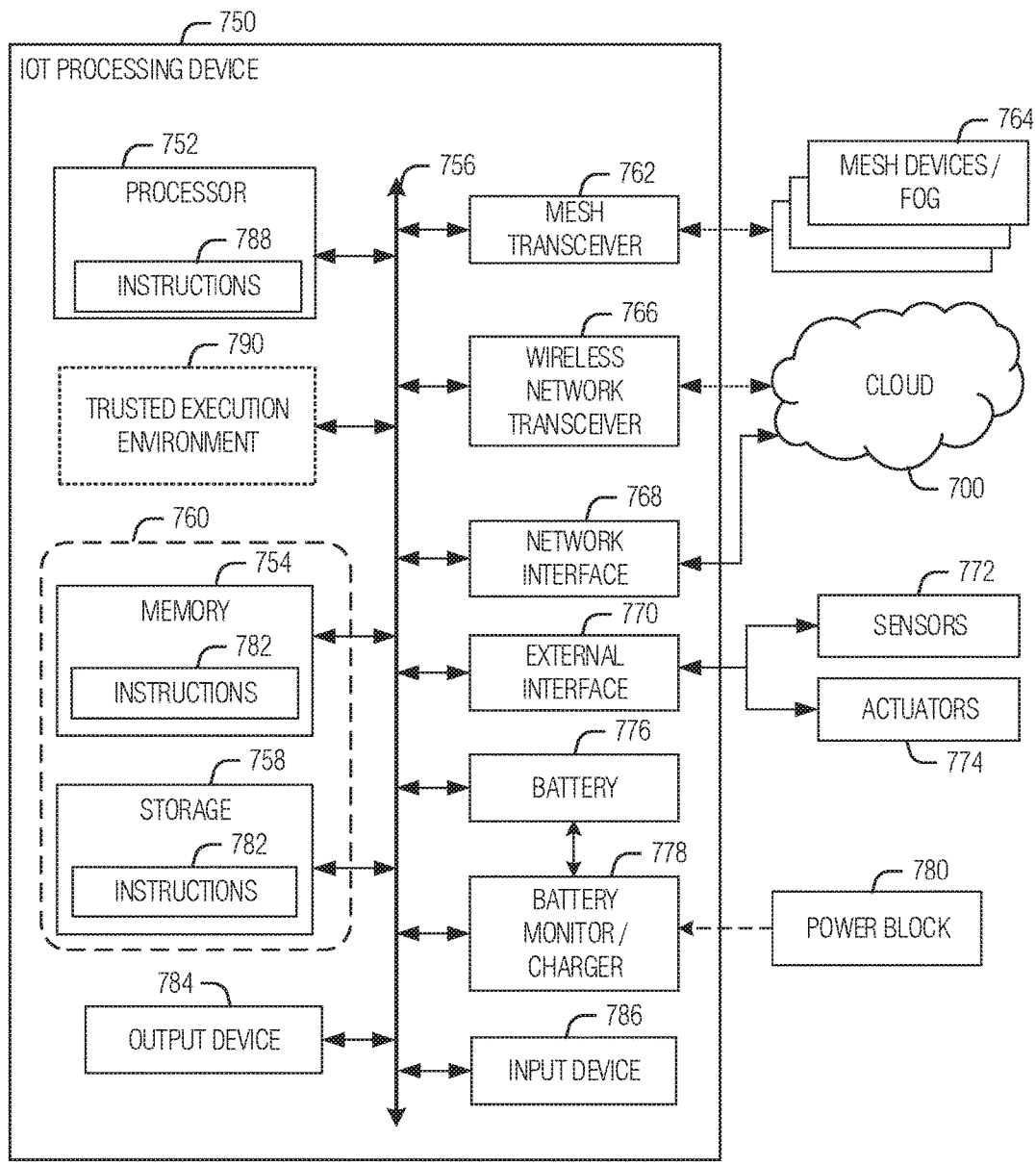
FIG. 7 is a block diagram of an example of components that may be present in an Internet of Things device, according to an embodiment.

FIG. 7 is a block diagram of an example of components that may be present in an IoT device 750 for implementing the techniques described herein. The IoT device 750 may include any combinations of the components shown in the example or referenced in the disclosure above. The components may be implemented as ICs, portions thereof, discrete electronic devices, or other modules, logic, hardware, software, firmware, or a combination thereof adapted in the IoT device 750, or as components otherwise incorporated within a chassis of a larger system. Additionally, the block diagram of FIG. 7 is intended to depict a high-level view of components of the IoT device 750. However, some of the components shown may be omitted, additional components may be present, and different arrangement of the components shown may occur in other implementations.

The IoT device 750 may include a processor 752, which may be a microprocessor, a multi-core processor, a multi-threaded processor, an ultra-low voltage processor, an embedded processor, or other known processing element. The processor 752 may be a part of a system on a chip (SoC) in which the processor 752 and other components are formed into a single integrated circuit, or a single package, such as the Edison™ or Galileo™ SoC boards from Intel. As an example, the processor 752 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example the storage 758 may be implemented via a solid state disk drive (SSDD). Other devices that may be used for the storage 758 include flash memory cards, such as SD cards, microSD cards, xD picture cards, and the like, and USB flash drives. In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in a SoC based system. Other bus systems may be included, such as an I2C interface, an SPI interface, point to point interfaces, and a power bus, among others.

The interconnect 756 may couple the processor 752 to a mesh transceiver 762, for communications with other mesh devices 764. The mesh transceiver 762 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 764. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area, protocol, may occur via a WWAN unit.

The mesh transceiver 762 may communicate using multiple standards or radios for communications at different range. For example, the IoT device 750 may communicate with close devices, e.g., within about 10 meters, using a local transceiver based on BLE, or another low power radio, to save power. More distant mesh devices 764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 766 may be included to communicate with devices or services in the cloud 700 via local or wide area network protocols. The wireless network transceiver 766 may be a LPWA transceiver that follows the IEEE 802.15.4, or IEEE 802.15.4g standards, among others. The IoT device 750 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 762 and wireless network transceiver 766, as described herein. For example, the radio transceivers 762 and 766 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 762 and 766 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (CPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 766, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 768 may be included to provide a wired communication to the cloud 700 or to other devices, such as the mesh devices 764. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to allow connect to a second network, for example, a NIC 768 providing communications to the cloud over Ethernet, and a second NIC 768 providing communications to other devices over another type of network.

The interconnect 756 may couple the processor 752 to an external interface 770 that is used to connect external devices or subsystems. The external devices may include sensors 772, such as accelerometers, level sensors, flow sensors, optical light sensors, camera sensors, temperature sensors, a global positioning system (GPS) sensors, pressure sensors, barometric pressure sensors, and the like. The external interface 770 further may be used to connect the IoT device 750 to actuators 774, such as power switches, valve actuators, an audible sound generator, a visual warning device, and the like.

In some optional examples, various input/output (I/O) devices may be present within, or connected to, the IoT device 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 750.

A battery 776 may power the IoT device 750, although in examples in which the IoT device 750 is mounted in a fixed location, it may have a power supply coupled to an electrical grid. The battery 776 may be a lithium ion battery, or a metal-air battery, such as a zinc-air battery, an aluminum-air battery, a lithium-air battery, and the like.

A battery monitor/charger 778 may be included in the IoT device 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) convertor that allows the processor 752 to directly monitor the voltage of the battery 776 or the current flow from the battery 776. The battery parameters may be used to determine actions that the IoT device 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the IoT device 750. A wireless battery charging circuit, such as an LTC4020 chip from Linear Technologies of Milpitas, Calif., among others, may be included in the battery monitor/charger 778. The specific charging circuits chosen depend on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine readable medium 760 including code to direct the processor 752 to perform electronic operations in the IoT device 750. The processor 752 may access the non-transitory, machine readable medium 760 over the interconnect 756. For instance, the non-transitory, machine readable medium 760 may be embodied by devices described for the storage 758 of FIG. 5 or may include specific storage units such as optical disks, flash drives, or any number of other hardware devices. The non-transitory, machine readable medium 760 may further include, provide, or invoke instructions 788 to direct the processor 752 to perform a specific sequence or flow of actions, for example, as described with respect to the flowchart(s) and block diagram(s) of operations and functionality depicted above.

In an example, the instructions 788 on the processor 752 (separately, or in combination with the instructions 788 of the machine readable medium 760) may configure execution or operation of a trusted execution environment (TEE) 790. In an example, the TEE 790 operates as a protected area accessible to the processor 752 to enable secure access to data and secure execution of instructions. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 8:
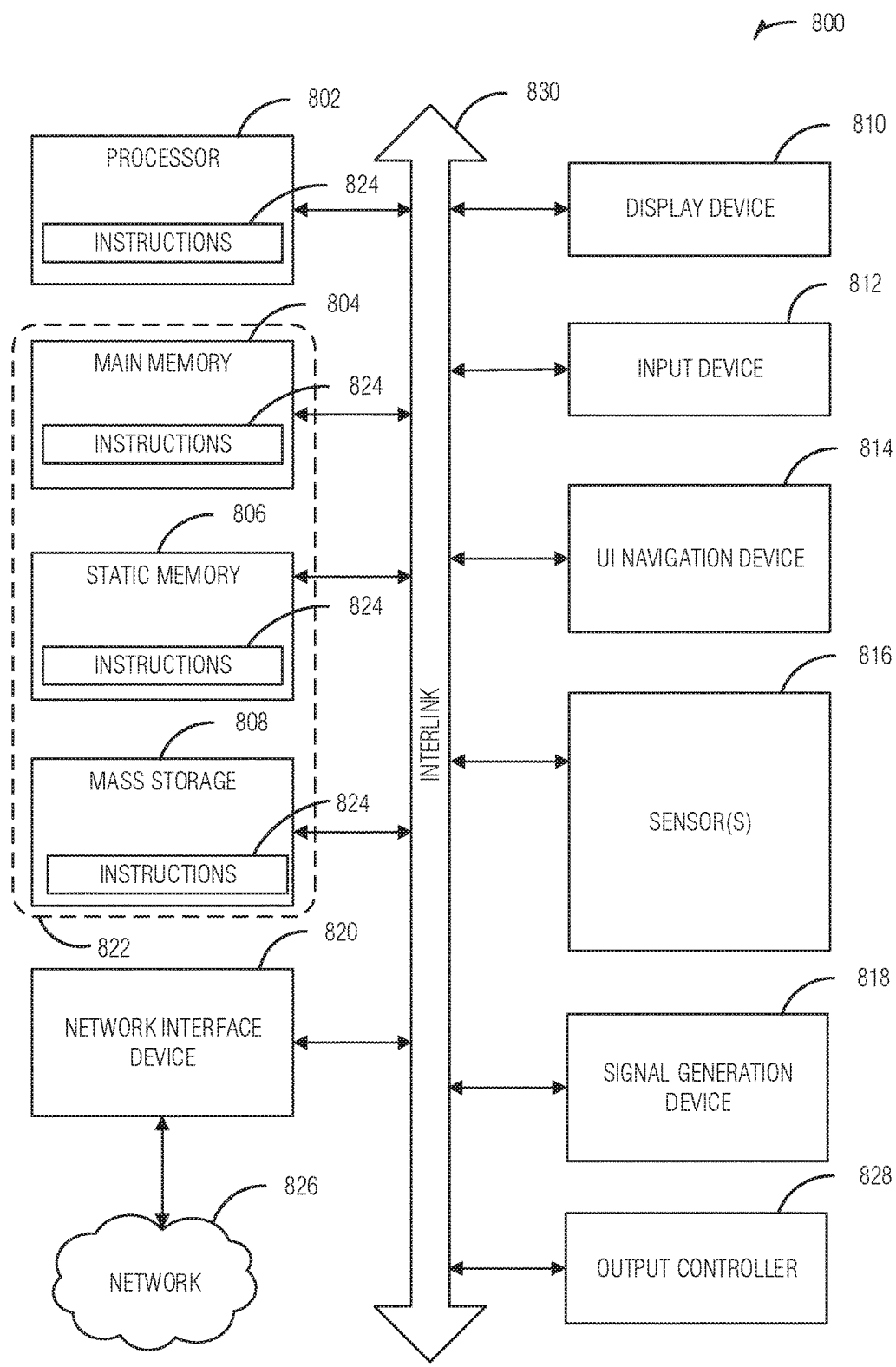
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static, memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Figure 9:
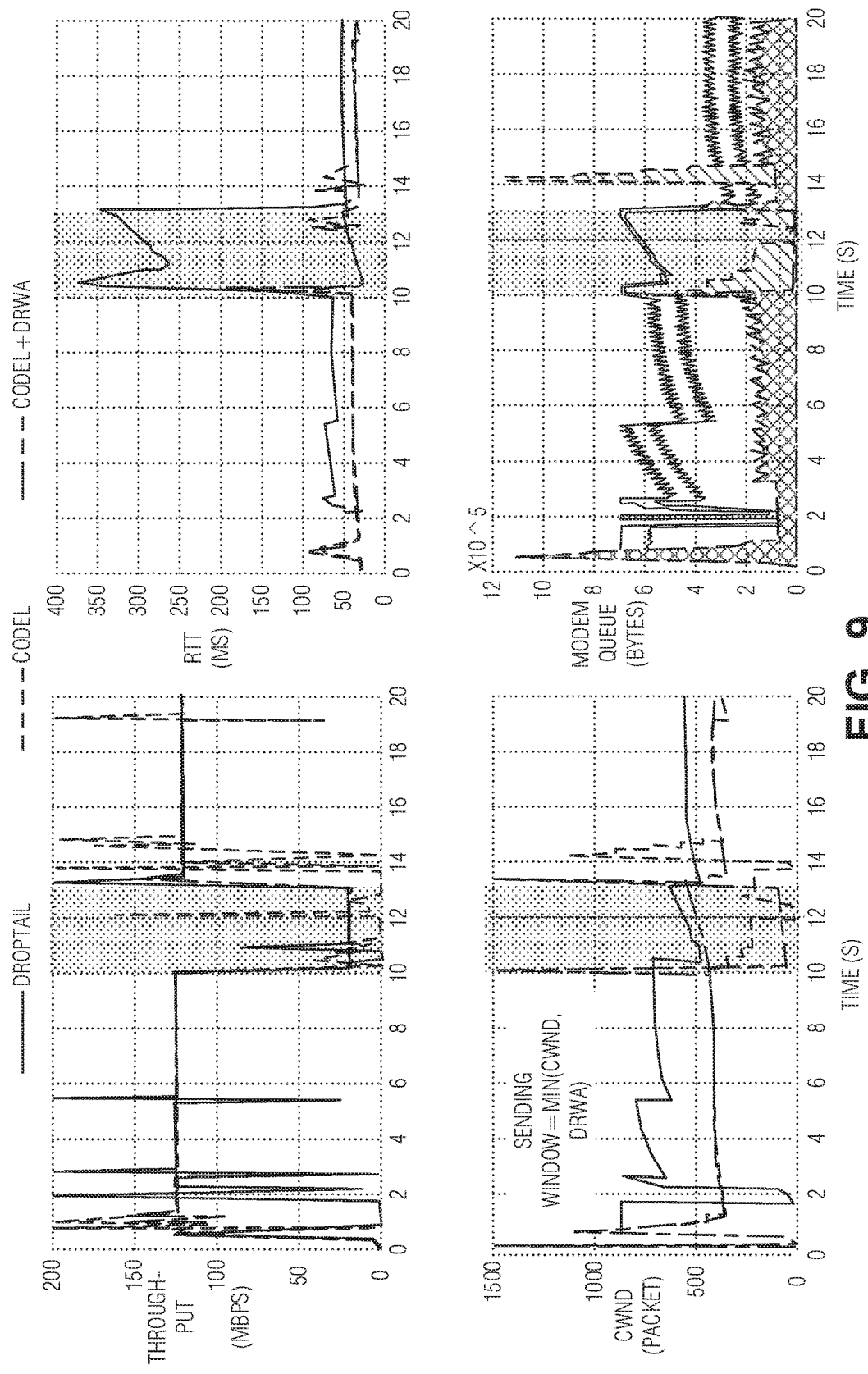
FIG. 9 illustrates an example of simulation results, according to an embodiment.

FIG. 9 illustrates an example of simulation results, according to an embodiment. FIG. 9 compares the following three techniques through simulation using the NS3-based 5G simulator (/nyuwireless/ns3-mmwave):
1. Droptail: drop TCP data packet if the buffer is full
2. CoDel: drop TCP data packet based on the CoDel algorithm [2]
3. CoDel+DRWA: our proposed dynamic DRWA method with option #1 (e.g., per-UE control)

The grey to highlights the blockage time interval (of about 10 s to 13 s). With the normal drop-tail scheme (solid line and white fill), TCP experiences high delay (e.g. >250 ms) during the blockage. The CoDel technique (dashed line with diagonal fill), an active queue management, reduces delay, but also deteriorates end-to-end (e2e) throughput. The techniques described above (long and short dashes with crosshatch fill), the delay is reduced, and there is no throughput degradation.

ADDITIONAL NOTES & EXAMPLES

Example 1 is an apparatus for transmission control protocol (TCP) receiver controlled interruption mitigation, the apparatus included in a first device, apparatus comprising: a buffer to store a transmission queue; and processing circuitry to: obtain a physical link degradation indication of a physical link; measure, in response to the physical link degradation indication, a transmission queue to determine bufferbloat that is a result of a temporary blockage of the physical link; and initiate transmission, to a second device on the physical link in response to the temporary blockage, of a TCP receive window size update that is smaller than a previous TCP receive window size.

In Example 2, the subject matter of Example 1 includes, wherein the TCP receive window size update applies to all TCP streams for the first device.

In Example 3, the subject matter of Examples 1-2 includes, wherein the TCP receive window size update is specific to each TCP stream for the first device.

In Example 4, the subject matter of Examples 1-3 includes, wherein the TCP receive window size update is based on a degree of the temporary blockage.

In Example 5, the subject matter of Example 4 includes, wherein the degree of the temporary blockage is based on the transmission queue.

In Example 6, the subject matter of Example 5 includes, wherein the processing circuitry is to: decrease a subsequent TCP receive window size update in accordance with a change in the transmission queue; and initiate a transmission, to the second device on the physical link, of the subsequent TCP receive window size update.

In Example 7, the subject matter of Examples 1-6 includes, wherein bufferbloat occurs when a minimum delay for packets in the transmission queue exceeds a threshold.

In Example 8, the subject matter of Examples 1-7 includes, wherein the apparatus operates at a packet data convergence protocol (PDCP) layer of a communication stack.

In Example 9, the subject matter of Examples 1-8 includes, wherein the physical link is a millimeter wave radio link.

In Example 10, the subject matter of Example 9 includes, the physical link degradation indication is at least one of channel quality indication (CQI), received signal strength indicator (RSSI), reference signal received power (RSRP), or reference signal received quality (RSRQ).

In Example 11, the subject matter of Example 10 includes, wherein blockage of the physical link is indicated in response to a twenty decibel drop of signal strength with a one hundred millisecond window.

In Example 12, the subject matter of Examples 1-11 includes, wherein the first device operates in accordance with a 3GPP family of standards.

In Example 13, the subject matter of Examples 1-12 includes, wherein the first device operates in accordance with an IEEE 802.11 family of standards.

Example 14 is a method for transmission control protocol (TCP) receiver controlled interruption mitigation, the method performed by a first device, method comprising: obtaining a physical link degradation indication of a physical link; measuring, in response to the physical link degradation indication, a transmission queue to determine bufferbloat that is a result of a temporary blockage of the physical link; and transmitting, to a second device on the physical link in response to the temporary blockage, a TCP receive window size update that is smaller than a previous TCP receive window size.

In Example 15, the subject matter of Example 14 includes, wherein the TCP receive window size update applies to all TCP streams for the first device.

In Example 16, the subject matter of Examples 14-15 includes, wherein the TCP receive window size update is specific to each TCP stream for the first device.

In Example 17, the subject matter of Examples 14-16 includes, wherein the TCP receive window size update is based on a degree of the temporary blockage.

In Example 18, the subject matter of Example 17 includes, wherein the degree of the temporary blockage is based on the transmission queue.

In Example 19, the subject matter of Example 18 includes, decreasing a subsequent TCP receive window size update in accordance with a change in the transmission queue; and transmitting, to the second device on the physical link, the subsequent TCP receive window size update.

In Example 20, the subject matter of Examples 14-19 includes, wherein bufferbloat occurs when a minimum delay for packets in the transmission queue exceeds a threshold.

In Example 21, the subject matter of Examples 14-20 includes, wherein measuring the transmission queue and transmitting the TCP receive window size update are performed at a packet data convergence protocol (PDCP) layer of a communication stack.

In Example 22, the subject matter of Examples 14-21 includes, wherein the physical link is a millimeter wave radio link.

In Example 23, the subject matter of Example 22 includes, the physical link degradation indication is at least one of channel quality indication (CQI), received signal strength indicator (RSSI), reference signal received power (RSRP), or reference signal received quality (RSRQ).

In Example 24, the subject matter of Example 23 includes, wherein blockage of the physical link is indicated in response to a twenty decibel drop of signal strength with a one hundred millisecond window.

In Example 25, the subject matter of Examples 14-24 includes, wherein the first device operates in accordance with a 3GPP family of standards.

In Example 26, the subject matter of Examples 14-25 includes, wherein the first device operates in accordance with an IEEE 802.11 family of standards.

Example 27 is at least one machine readable medium including instructions that, when executed by processing circuitry, cause the processing circuitry to perform any method of Examples 14-26.

Example 28 is a system comprising means to perform any method of Examples 14-26.

Example 29 is at least one machine readable medium including instructions for transmission control protocol (TCP) receiver controlled interruption mitigation, the instructions, when executed by processing circuitry of a first device, cause the processing circuitry to perform operations comprising: obtaining a physical link degradation indication of a physical link; measuring, in response to the physical link degradation indication, a transmission queue to determine bufferbloat that is a result of a temporary blockage of the physical link; and transmitting, to a second device on the physical link in response to the temporary blockage, a TCP receive window size update that is smaller than a previous TCP receive window size.

In Example 30, the subject matter of Example 29 includes, wherein the TCP receive window size update applies to all TCP streams for the first device.

In Example 31, the subject matter of Examples 29-30 includes, wherein the TCP receive window size update is specific to each TCP stream for the first device.

In Example 32, the subject matter of Examples 29-31 includes, wherein the TCP receive window size update is based on a degree of the temporary blockage.

In Example 33, the subject matter of Example 32 includes, wherein the degree of the temporary blockage is based on the transmission queue.

In Example 34, the subject matter of Example 33 includes, wherein the operations comprise: decreasing a subsequent TCP receive window size update in accordance with a change in the transmission queue; and transmitting, to the second device on the physical link, the subsequent TCP receive window size update.

In Example 35, the subject matter of Examples 29-34 includes, wherein bufferbloat occurs when a minimum delay for packets in the transmission queue exceeds a threshold.

In Example 36, the subject matter of Examples 29-35 includes, wherein measuring the transmission queue and transmitting the TCP receive window size update are performed at a packet data convergence protocol (PDCP) layer of a communication stack.

In Example 37, the subject matter of Examples 29-36 includes, wherein the physical link is a millimeter wave radio link.

In Example 38, the subject matter of Example 37 includes, the physical link degradation indication is at least one of channel quality indication (CQI), received signal strength indicator (RSSI), reference signal received power (RSRP), or reference signal received quality (RSRQ).

In Example 39, the subject matter of Example 38 includes, wherein blockage of the physical link is indicated in response to a twenty decibel drop of signal strength with a one hundred millisecond window.

In Example 40, the subject matter of Examples 29-39 includes, wherein the first device operates in accordance with a 3GPP family of standards.

In Example 41, the subject matter of Examples 29-40 includes, wherein the first device operates in accordance with an IEEE 802.11 family of standards.

Example 42 is a system, of a first device, for transmission control protocol (TCP) receiver controlled interruption mitigation, the system comprising: means for obtaining a physical link degradation indication of a physical link; means for measuring, in response to the physical link degradation indication, a transmission queue to determine bufferbloat that is a result of a temporary blockage of the physical link; and means for transmitting, to a second device on the physical link in response to the temporary blockage, a TCP receive window size update that is smaller than a previous TCP receive window size.

In Example 43, the subject matter of Example 42 includes, wherein the TCP receive window size update applies to all TCP streams for the first device.

In Example 44, the subject matter of Examples 42-43 includes, wherein the TCP receive window size update is specific to each TCP stream for the first device.

In Example 45, the subject matter of Examples 42-44 includes, wherein the TCP receive window size update is based on a degree of the temporary blockage.

In Example 46, the subject matter of Example 45 includes, wherein the degree of the temporary blockage is based on the transmission queue.

In Example 47, the subject matter of Example 46 includes, means for decreasing a subsequent TCP receive window size update in accordance with a change in the transmission queue; and means for transmitting, to the second device on the physical link, the subsequent TCP receive window size update.

In Example 48, the subject matter of Examples 42-47 includes, wherein bufferbloat occurs when a minimum delay for packets in the transmission queue exceeds a threshold.

In Example 49, the subject matter of Examples 42-48 includes, wherein the means for measuring the transmission queue and means for transmitting the TCP receive window size update are operate at a packet data convergence protocol (PDCP) layer of a communication stack.

In Example 50, the subject matter of Examples 42-49 includes, wherein the physical link is a millimeter wave radio link.

In Example 51, the subject matter of Example 50 includes, the physical link degradation indication is at least one of channel quality indication (CQI), received signal strength indicator (RSSI), reference signal received power (RSRP), or reference signal received quality (RSRQ).

In Example 52, the subject matter of Example 51 includes, wherein blockage of the physical link is indicated in response to a twenty decibel drop of signal strength with a one hundred millisecond window.

In Example 53, the subject matter of Examples 42-52 includes, wherein the first device operates in accordance with a 3GPP family of standards.

In Example 54, the subject matter of Examples 42-53 includes, wherein the first device operates in accordance with an IEEE 802.11 family of standards.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus for transmission control protocol (TCP) receiver controlled interruption mitigation, the apparatus included in a first device, the apparatus comprising:
   a buffer to store a transmission queue; and
   processing circuitry to:
   obtain a physical link degradation indication of a physical link;
   measure, in response to the physical link degradation indication, a transmission queue to determine buffer-bloat that is a result of a temporary blockage of the physical link;
   initiate transmission, to a second device on the physical link in response to the temporary blockage, of a TCP receive window size update that is smaller than a previous TCP receive window size, wherein the TCP receive window size update is based on a degree of the temporary blockage, wherein the degree of the temporary blockage is based on the transmission queue;
   decrease a subsequent TCP receive window size update in accordance change in the transmission queue; and
   initiate a transmission, to the second device on the physical link, of the subsequent TCP receive window size update.

2. The apparatus of claim 1, wherein the TCP receive window size update applies to all TCP streams for the first device.

3. The apparatus of claim 1, wherein the physical link is a millimeter wave radio link.

4. The apparatus of claim 3, the physical link degradation indication is at least one of channel quality indication (CQI), received signal strength indicator (RSSI), reference signal received power (RSRP), or reference signal received quality (RSRQ).

5. The apparatus of claim 4, wherein blockage of the physical link is indicated in response to a twenty decibel drop of signal strength with a one hundred millisecond window.

6. A method for transmission control protocol (TCP) receiver controlled interruption mitigation, the method performed by a first device, method comprising:
   obtaining a physical link degradation indication of a physical link;
   measuring, in response to the physical link degradation indication, a transmission queue to determine buffer-bloat that is a result of a temporary blockage of the physical link;
   transmitting, to a second device on the physical link in response to the temporary blockage, a TCP receive window size update that is smaller than a previous TCP receive window size, wherein the TCP receive window size update is based on a degree of the temporary blockage, wherein the degree of the temporary blockage is based on the transmission queue;
   decreasing a subsequent TCP receive window size update in accordance with a change in the transmission queue; and
   transmitting, to the second device on the physical link, the subsequent TCP receive window size update.

7. The method of claim 6, wherein the TCP receive window size update applies to all TCP streams for the first device.

8. The method of claim 6, wherein the physical link is a millimeter wave radio link.

9. The method of claim 8, the physical link degradation indication is at least one of channel quality indication (CQI), received signal strength indicator (RSSI), reference signal received power (RSRP), or reference signal received quality (RSRQ).

10. The method of claim 9, wherein blockage of the physical link is indicated in response to a twenty decibel drop of signal strength with a one hundred millisecond window.

11. At least one non-transitory machine readable medium including instructions for transmission control protocol (TCP) receiver controlled interruption mitigation, the instructions, when executed by processing circuitry of a first device, cause the processing circuitry to perform operations comprising:
obtaining a physical link degradation indication of a physical link;
measuring, in response to the physical link degradation indication, a transmission queue to determine bufferbloat that is a result of a temporary blockage of the physical link;
transmitting, to a second device on the physical link in response to the temporary blockage, a TCP receive window size update that is smaller than a previous TCP receive window size, wherein the TCP receive window size update is based on a degree of the temporary blockage, wherein the degree of the temporary blockage is based on the transmission queue;
decreasing a subsequent TCP receive window size update in accordance with a change in the transmission queue; and
transmitting, to the second device on the physical link, the subsequent TCP receive window size update.

12. The at least one non-transitory machine readable medium of claim 11, wherein the TCP receive window size update applies to all TCP streams for the first device.

13. The at least one non-transitory machine readable medium of claim 11, wherein the physical link is a millimeter wave radio link.

14. The at least one non-transitory machine readable medium of claim 13, the physical link degradation indication is at least one of channel quality indication (CQI), received signal strength indicator (RSSI), reference signal received power (RSRP), or reference signal received quality (RSRQ).

15. The at least one non-transitory machine readable medium of claim 14, wherein blockage of the physical link is indicated in response to a twenty decibel drop of signal strength with a one hundred millisecond window.

16. The apparatus of claim 1, wherein the TCP receive window size update is specific to each TCP stream for the first device.

17. The apparatus of claim 1, wherein bufferbloat occurs when a minimum delay for packets in the transmission queue exceeds a threshold.

18. The apparatus of claim 1, wherein the apparatus operates at a packet data convergence protocol (PDCP) layer of a communication stack.

19. The method of claim 6, wherein the TCP receive window size update is specific to each TCP stream for the first device.

20. The method of claim 6, wherein bufferbloat occurs when a minimum delay for packets in the transmission queue exceeds a threshold.

21. The method of claim 6, wherein measuring the transmission queue and transmitting the TCP receive window size update are performed at a packet data convergence protocol (PDCP) layer of a communication stack.

22. The at least one non-transitory machine readable medium of claim 11, wherein the TCP receive window size update is specific to each TCP stream for the first device.

23. The at least one non-transitory machine readable medium of claim 11, wherein bufferbloat occurs when a minimum delay for packets in the transmission queue exceeds a threshold.

24. The at least one non-transitory machine readable medium of claim 11, wherein measuring the transmission queue and transmitting the TCP receive window size update are performed at a packet data convergence protocol (PDCP) layer of a communication stack.

* * * * *

UNITED STATES PATENT AND TRADEMARK OFFICE
CERTIFICATE OF CORRECTION

PATENT NO. : 10,454,840 B2
APPLICATION NO. : 15/868802
DATED : October 22, 2019
INVENTOR(S) : Zhang et al.

Page 1 of 1

It is certified that error appears in the above-identified patent and that said Letters Patent is hereby corrected as shown below:

In the Claims

In Column 24, Line 29, in Claim 1, after "accordance", insert --with a--

In Column 25, Line 1, in Claim 7, delete "claim6," and insert --claim 6,-- therefor Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*